Figure 1:
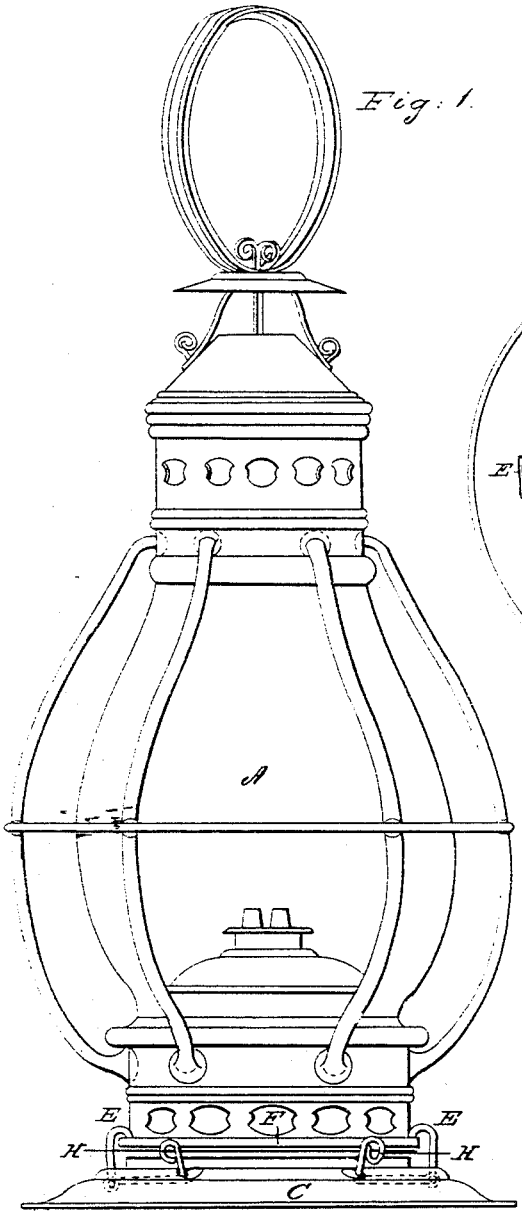
Figure 2:
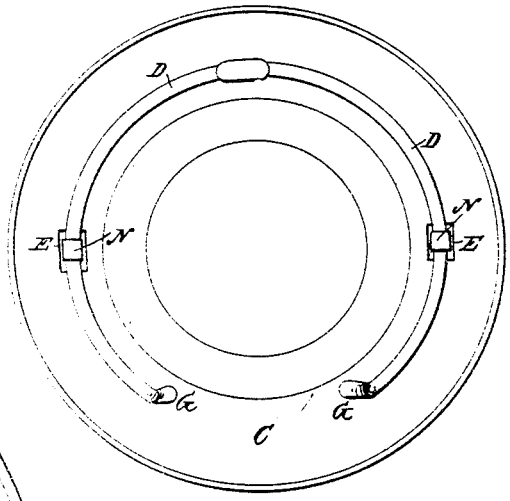
Figure 3:
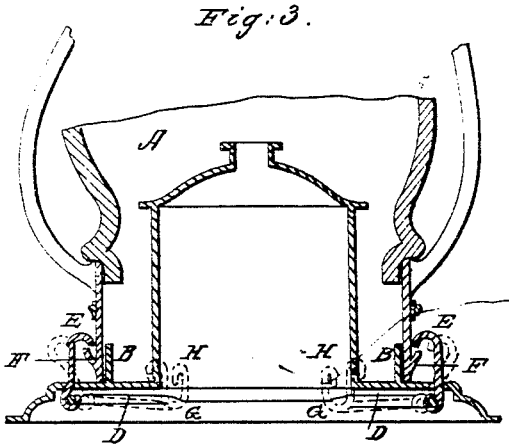

BEST AVAILABLE COPY

J. FLEMING.

Lantern.

~~No. 208.~~

A. I. Patented Nov. 2, 1858.